Oct. 27, 1970     E. H. PETREE     3,536,271
WIRE WRAPPING APPARATUS
Filed Jan. 23, 1969
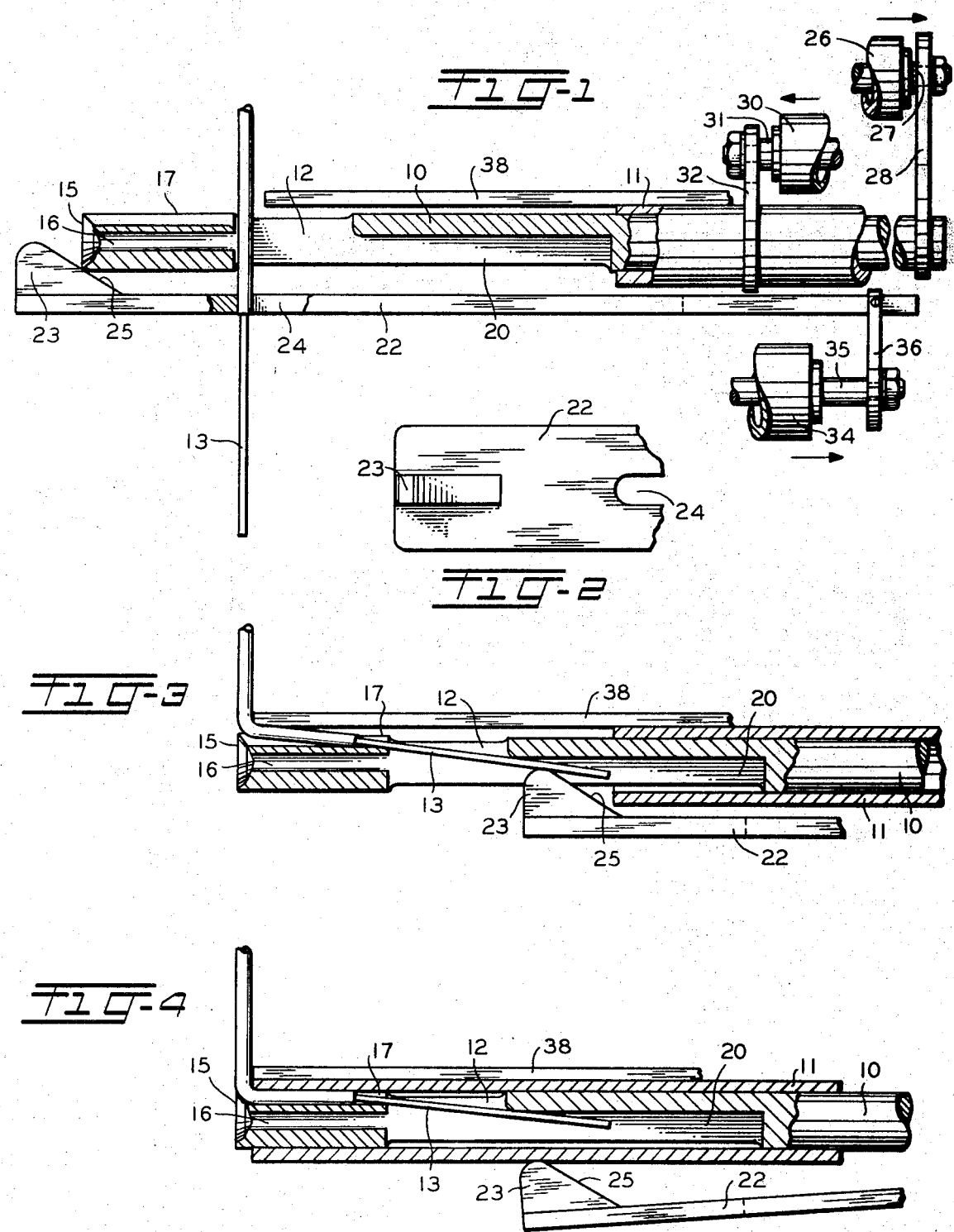
INVENTOR
E. H. PETREE
D. W. Marks
BY
ATTORNEY United States Patent Office 3,536,271
Patented Oct. 27, 1970

1

3,536,271
WIRE WRAPPING APPARATUS
Edwyn H. Petree, Burlington, N.C., assignor to Western Electric Company, Incorporated, New York, N.Y., a corporation of New York
Filed Jan. 23, 1969, Ser. No. 793,472
Int. Cl. H01r 5/08
U.S. Cl. 242—7.06                3 Claims

ABSTRACT OF THE DISCLOSURE

A wire wrapping tool has a resilient arm with a projection for laying an end of a wire in a groove in a wire wrapping bit. The projection has a camming surface which is engaged by a sleeve moving over the bit to move the arm from the bit and enclose the end of the wire in the tool.

GOVERNMENT CONTRACT

The invention herein claimed was made in the course of or under contract with the United States Army.

BACKGROUND OF THE INVENTION

Field of the invention

In the manufacture of complex electrical equipment, wires are connected to various terminals by wrapping the ends of bared wires on the terminals. This invention is concerned with both automactic and manual apparatus utilized in the wrapping of the wires on the terminal.

Description of the prior art

The prior art contains many tools which may be utilized in automatic apparatus or manual apparatus for wrapping the ends of a wire on a terminal. Many of these prior art tools employ apparatus for automatically gripping and holding the wire in the tool. However, generally, the prior art tools which automatically grip and hold the wire are unreliable or inefficient in operation.

SUMMARY OF THE INVENTION

An object of the present invention is a new and improved apparatus for wrapping a wire on a terminal.

Another object of the invention is a new and improved wire wrapping apparatus which automatically grips and holds a wire.

Another object of the invention is a new and improved tool having facilities for totally enclosing the end of the wire in the tool prior to wrapping the wire.

In accordance with these and other objects, the invention contemplates a wire wrapping tool having a sleeve which descends over a spindle to enclose the end of the wire in a groove in the spindle. A resilient arm has a projection which moves upward to lay the wire in the groove prior to the descent of the sleeve.

In an additional feature of the invention, the projection includes a camming surface which is engaged by the end of the descending sleeve to move the arm away from the spindle.

BRIEF DESCRIPTION OF THE DRAWING

FIG. 1 is a cross-sectional view of a wire wrapping apparatus incorporating the features of the invention.

FIG. 2 is a side sectional view of an arm for laying the wire in a groove in the spindle of the apparatus of FIG. 1.

FIGS. 3 and 4 are cross-sectional views showing relative positions of the apparatus shown in FIG. 1, during the operation of the wire wrapping apparatus.

DETAILED DESCRIPTION

Referring to FIG. 1, there is shown a wire wrapping tool having a spindle 10 and a sleeve 11 slidably mounted on the spindle 10. The spindle 10 has a transverse slot 12 for receiving the end of a wire 13 which passes beneath a staionary member 38 and is inserted in the tool. The spindle 10 also includes a longitudinal bore 16 in one end 15 of the spindle for receiving a terminal (not shown) upon which the end of the wire 13 is to be wrapped.

The spindle 10 has a groove 17 extending from the slot 12 to the end 15 of the spindle which cooperates with the sleeve 11, as shown in FIG. 4, to form a passageway for enclosing an intermediate portion of the wire 13. The passageway formed by the groove 17 and the sleeve 10 guides the wire as the spindle 10 and the sleeve 11 are rotated about a terminal to wrap the wire on the terminal as the wire is withdrawn from the passageway. This passageway may alternately be formed by a groove in the inner surface of the sleeve 11 and the outer surface of the spindle 10 or by mating grooves in both the spindle and sleeve.

The spindle 10 has a longitudinal groove 20 which extends upward from the slot 12 away from the end 15 of the tool. The groove 20 receives the end of the wire 13 prior to the movement of the sleeve 11 over the spindle 10 which encloses the end of the wire 13 in the tool. Enclosing the end of the wire 13 in the tool prevents whipping of the end of the wire during subsequent rotation of the spindle 10 and sleeve 11 which could result in kinking or bending of the wire 13 to produce uneven tension or breakage as the wire is withdrawn from the passageway formed by the groove 17 and the sleeve 11 during the wire wrapping process.

A longitudinally movable arm 22 has a projection 23 for laying the end of the wire 13 within the groove 20 prior to the descent of the sleeve 11. The arm 22, as shown in FIG. 2, also has a slot 24 for receiving the end of the wire 13 when it is inserted in the tool. The projection 23 has a camming surface 25 which is engaged by the end of the sleeve 11 to bend the arm 22 away from the spindle 10. The arm 22 may be made of resilient material to allow it to bend, or the arm 22 may be pivotally mounted on an arm 36 and spring biased to urge the projection 23 into the groove 20.

An air cylinder 26 has a piston rod 27 with an arm 28 rotatably connected to the spindle 10. The spindle 10 is free to rotate with respect to the arm 11 but movement of the piston rod 27 moves the spindle 10 longitudinally. A piston 30 has a piston rod 31 connected by an arm 32 to the sleeve 11. The sleeve 11 is free to rotate with respect to the arm 32 but follows the longitudinal movement of the arm 32. Conveniently, the spindle 10 and the sleeve 11 are intersplined or have a pin and slot arrangement such that they may not rotate with respect to each other but are free to move longitudinally with respect to each other. Alternatively, the sleeve 11 and spindle 10 are not intersplined and sleeve 11 does not rotate. Only the spindle 10 with the groove 17 rotates to wrap the end of the wire on the terminal. A motor (not shown) is connected to the spindle 10 for rotating the spindle 10 and sleeve 11. An air cylinder 34 has a piston rod 35 connected by an arm 36 to the arm 22 for moving the arm 22 longitudinally with respect to the tool.

OPERATION

Referring first to FIG. 1, the end of a wire 13 is first inserted through the transverse slot 12 of the spindle 10 and the slot 24 in the arm 22. The tool at this time has the sleeve 11 raised as shown in FIG. 1. In the next step, shown in FIG. 3, the spindle 10 is raised by actuation of the air cylinder 26 to bend the wire 13 around a stationary member 38 near the end 15 of the spindle. Also, the air cylinder 34 is actuated to raise the arm 22 which results in the projection 23 pressing or laying the end of the wire 13 in the groove 20.

The air cylinder 30 is then actuated to lower the sleeve 11 over the spindle 10 as shown in FIG. 4. As the sleeve 11 starts its downward movement, it engages the camming surface 25 on the projection 23 to bend the arm 20 away from the spindle 15. As can be seen from FIG. 3, the camming surface 25 is designed such that the end of the wire 13 is received by the descending sleeve 11 prior to engagement of the end of the sleeve 11 with the camming surface 25. Due to the shape of the camming surface 25, the end of the wire 13 is not allowed to spring out from the groove 20 due to resiliency of the wire and the release of the arm 22.

Further descent of the sleeve 11 over the spindle 10 encloses an intermediate portion of the wire 13 in a passageway formed by groove 17 and the inside wall of the sleeve 11. The wire is now captured in the wire wrapping tool in preparation to the wrapping of the wire on a terminal in a manner that is well known in the art.

The above-described embodiment is simply illustrative of the principles of the invention and many other embodiments may be devised without departing from the scope and spirit of the invention.

What is claimed is:
1. A wire wrapping tool comprising:
a spindle having a transverse slot therein for receiving one end of a wire;
a sleeve on the spindle slidable with respect to the spindle, said sleeve and spindle designed to form a longitudinal passageway extending from the transverse slot to one end of the spindle and one end of the sleeve for receiving an intermediate portion of the wire when the one end of the sleeve is moved over the transverse slot to the one end of the spindle;
said spindle having a longitudinal groove extending from the transverse slot in the opposite direction from the one end of the spindle for receiving the one end of the wire;
a resilient arm having a projection for urging the one end of the wire into the groove; and
means for moving the arm longitudinally with respect to the spindle such that the projection lays the one end of the wire in the groove.

2. A wire wrapping tool comprising:
a spindle having a transverse slot therein for receiving one end of a wire;
said spindle having a longitudinal groove extending from the transverse slot in the opposite direction from one end of the spindle for receiving the one end of the wire;
a resilient arm having a projection for extending into the groove;
means for moving the arm longitudinally with respect to the spindle such that the projection lays the one end of the wire into the groove;
a longitudinally slidable sleeve on the spindle;
means for sliding the sleeve on the spindle to sequentially move one end of the sleeve over the groove, and over the transverse slot to the one end of the spindle; and
said sleeve and spindle designed to form a longitudinal passageway extending from the transverse slot to the one end of the spindle and sleeve for receiving an intermediate portion of the wire.

3. A wire wrapping tool as defined in claim 2, wherein:
the projection on the resilient arm has a camming surface which is engaged by the one end of the sleeve to move the arm from the spindle.

References Cited
UNITED STATES PATENTS

| | | | |
|---|---|---|---|
| 2,648,356 | 8/1953 | Beaulieu et al. | 242—7.17 |
| 2,863,610 | 12/1958 | Chambers et al. | 242—7.17 |
| 2,885,764 | 5/1959 | Shulters et al. | 242—7.17 XR |
| 3,246,381 | 4/1966 | Etchison et al. | 29—33.10 |
| 3,360,808 | 1/1968 | Taysom | 242—7.17 XR |

BILLY S. TAYLOR, Primary Examiner